United States Patent [19]
Motobu et al.

[11] Patent Number: 5,427,208
[45] Date of Patent: Jun. 27, 1995

[54] BICYCLE FRONT WHEEL CONTROL MECHANISM

[75] Inventors: Hirotetsu Motobu, 21, Tsutsui-Iga-Nishi-machi, Momoyama, Fushimi-ku, Kyoto-shi, Kyoto-fu; Koji Yoshioka, 1-19-506, Minami-machi, Saidaiji, Nara-shi, Nara-ken; Masanobu Kita, 7, Shio-machi, Yamatokooriyama-shi, Nara-ken; Tadanori Azuma, Utsunomiya, all of Japan

[73] Assignees: Hirotetsu Motobu, Kyoto; Koji Yoshioka; Masanobu Kita, both of Nara, all of Japan

[21] Appl. No.: 348,963

[22] Filed: Nov. 28, 1994

Related U.S. Application Data

[63] Continuation of Ser. No. 30,874, Mar. 12, 1993, abandoned.

[30] Foreign Application Priority Data

Mar. 13, 1992 [JP] Japan .................. 4-055017

[51] Int. Cl.6 .................................. B60G 3/18
[52] U.S. Cl. .................................. 188/24.13; 280/277; 280/286; 188/114; 267/276; 267/279
[58] Field of Search ............ 280/277, 276, 283, 286; 188/24.13, 24.19, 114, 24.11; 267/276, 279–281

[56] References Cited

U.S. PATENT DOCUMENTS

| | | | |
|---|---|---|---|
| 2,258,359 | 10/1941 | Herold | 267/279 X |
| 2,303,568 | 12/1942 | McWhorter et al. | 280/286 |
| 2,729,465 | 1/1956 | Torre | 280/277 |
| 5,193,832 | 3/1993 | Wilson et al. | 280/277 X |

FOREIGN PATENT DOCUMENTS

| | | | |
|---|---|---|---|
| 0507241 | 12/1951 | Belgium | 280/286 |
| 3833880 | 4/1990 | Germany | 280/276 |
| 4119339 | 1/1992 | Germany | 280/277 |
| 58-27123 | 6/1983 | Japan . | |
| 5068875 | 3/1993 | Japan | 280/276 |

OTHER PUBLICATIONS

Literature of Spring 1975 Automobile Technology Assoc. Lecture, Spring 1975.

*Primary Examiner*—Josie A. Ballato
*Attorney, Agent, or Firm*—Evenson, McKeown, Edwards & Lenahan

[57] ABSTRACT

A bicycle front wheel control mechanism made up of a suspension system and a brake system. The suspension system has an eccentric retainer having an axle and two L-shaped members, and a shaft portion is carried by a housing through an elastic body at a perpendicularly upper part of the axle. The suspension system is so designed that it can rock relative to the front wheel around an axis of the shaft portion with an axial distance between the shaft portion and the axle as its radius, and the brake system is so designed that a side surface of a rim is made wide in a radial direction. By thus constructing the mechanism, the mechanism provides the following effects: (A) when the front wheel goes over a bump, shocks from the bottom and front can be moderated; (B) a rider can pedal a bicycle with his full strength on a flat road surface; (C) a part of the running energy exerted by a rider is not consumed by the suspension system; (D) locking of the wheel at the time of braking can be prevented; and (E) the mechanism is simple in its structure and requires no special maintenance and inspection.

11 Claims, 14 Drawing Sheets

BICYCLE FRONT WHEEL CONTROL MECHANISM

This application is a continuation of application Ser. No. 08/030,874, filed on Mar. 12, 1993 now abandoned.

BACKGROUND OF THE INVENTION

This invention relates to a bicycle front wheel control mechanism equipped with a suspension system and a brake system.

FIG. 22 is a view showing the working principle of a general conventional suspension system. 1 denotes a body, 2 denotes a wheel, and 3 denotes a coil spring. This suspension system is so devised that, when the body 1 and the wheel 2 advance in the direction of arrow A to get over a bump 4 of a road surface, the coil spring 3 contracts in a vertical direction to allow the wheel 2 to move up, to thereby dampen a shock given to the body 1.

It has so far been considered that the suspension system as mentioned above has not necessarily been required for an ordinary bicycle for the following reasons:

(1) The bicycle is a vehicle which is pedaled by a rider. However, when the suspension system as mentioned above is adopted, the body 1 is then adapted to vibrate in the vertical direction because of the coil spring 3. The result is that the rider cannot pedal it with all his strength because the spring takes up some of the force which should go to the pedals. Such a phenomenon is expressed as "loss of force".

(2) A part of running energy developed by the rider is consumed as vibration energy caused by the suspension system. This increases fatigue of the rider.

(3) Since the ordinary bicycle does not required much speed, any shock felt by the rider is comparatively small when he pedals the bicycle on a rough road. Therefore, a suspension system is not required.

Consequently, the use of the suspension system as mentioned above is only limited to bicycles referred to as "mountain bikes" which are used for riding around hills and fields for sport.

On the other hand, airplanes and automobiles are equipped with anti-skid devices in order to prevent their wheels from locking when braking. The reason is that, when the wheel locks during braking, not only is the braking distance elongated, but steering control is lost and the body moves in a direction other than that intended by the driver, i.e., the vehicle skids, thereby resulting in a dangerous situation. Such a device for preventing the locking of the wheel at the time of braking is also necessary for a bicycle. However, an appropriate system is not yet available at present.

In recent years, the speed of bicycles has been increased. This applies also to an ordinary bicycles. The speed of a bicycle can be increased up to the speed of a motorcycle owing to the development of an ultra lightweight body and a thin high-pressure tire, and to progress in the development of multi-speed gears. In such a high-speed bicycle, any shock felt by a rider when cycling on a rough road becomes is large, but the rider endures such shock under the existing circumstances. Accordingly, there is a strong need for a suspension system for bicycles.

However, when a suspension system as shown in FIG. 22 is adopted as it is, the above-mentioned problems (1) and (2) arise. Further, maintenance and inspection are troublesome. Moreover, there is another problem. As reported by one of the present inventors in the 1975's spring science lecture meeting held by the Automobile Technology Association; when a wheel 2 is about to go over a bump 4, not only is there a shock to the wheel 2 from the bottom but there is also a shock from the front which provides a force to the wheel 2 toward the rear. In the suspension system shown in FIG. 22, however, the shock from the bottom can be dampened but the shock from the front can not be dampened, so that a shock absorbing effect is not sufficient.

On the other hand, the danger due to locking of the wheel at the time of braking increases with an increase in the speed of the bicycle. For this reason, there is a need for measures for preventing the locking of the wheels even for bicycles.

An object of this invention is to solve the above-mentioned problems and to satisfy the needs. Another object of this invention is to provide a bicycle front wheel control mechanism which can mainly satisfy the following conditions:

(A) It will dampen not only a shock from the under side but also a shock from the front when a bicycle goes over a bump.

(B) A rider can pedal a bicycle with his full strength on a flat road surface without an accompanying vertical movement of the bicycle body.

(C) No part of the running energy produced by the rider is consumed by the suspension system.

(D) Locking of a wheel at the time of braking can be prevented.

(E) The control mechanism is simple in its structure and requires no special maintenance and inspection.

SUMMARY OF THE INVENTION

This invention provides a bicycle front wheel control mechanism having a suspension system attached to the front fork of the bicycle to support the front wheel and a brake system for braking the front wheel. The suspension system comprises an eccentric retainer formed into a crank-like structure comprising an axle which, itself, is made up of axially central eccentric shafts, and support shafts located at both ends of and in parallel with the eccentric shafts. The eccentric retainer is in alignment with an axle of the front wheel at the eccentric shafts and is supported at the support shafts by front forks through an elastic body at perpendicularly upper parts of the eccentric shafts. The eccentric retainer is adapted to be applied with an elastic force for supporting the support shaft in a perpendicularly upward direction and giving a restoring force to a rocking motion around the support shafts. The suspension system is adapted to be able to rock around the front wheel with the distance between the support shafts and the eccentric shafts as its radius. The brake system is adapted to press a braking surface in an axial direction on the front wheel by means of a braking member secured to the front fork so as to exert a braking force, and the braking surface has a sufficient radial width to always leave a portion which faces on the braking member in the axial direction even when the front wheel carries out the above rocking motion.

BRIEF DESCRIPTION OF THE DRAWINGS

Embodiments of this invention will be described hereunder with reference to the attached drawings wherein.

DETAILED DESCRIPTION OF THE INVENTION

Figure 1:
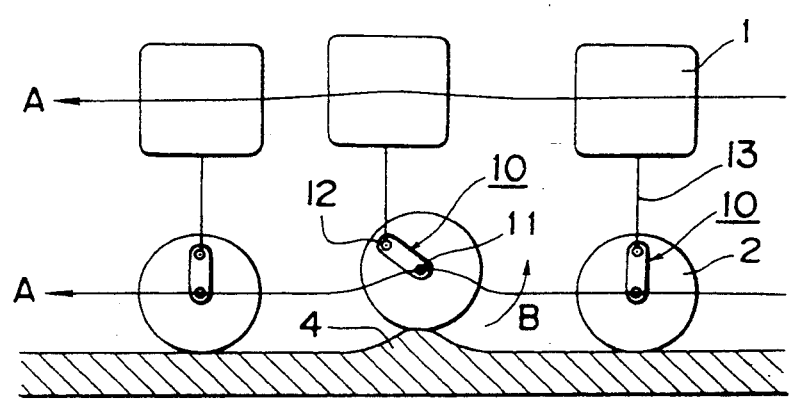
FIG. 1 is a schematic side view showing the working principle of a suspension system for a bicycle front wheel control mechanism according to this invention.

FIG. 1 schematically shows the working principle of a suspension system for bicycle front wheel control mechanism according to this invention. 10 denotes an eccentric retainer comprising the suspension system, 11 denotes an eccentric shaft, 12 denotes a support shaft and 13 denotes a fork. As shown in FIG. 1, while an elastic body located between the support shaft 12 and the front fork is twisted by a shock given to a wheel 2 from the front, the wheel 2 rocks toward the back (in the direction of arrow B) around the support shaft 12 with the distance between the eccentric shaft 11 and the support shaft 12 as its radius when the wheel 2 goes over a bump 4. Thereby, the shock given to the wheel 2 from the front is dampened. In addition, since the wheel 2 rocks to the back so that it also moves up, a shock given to the wheel 2 from just the bottom is also dampened. Namely, when the wheel 2 goes over the bump 4 on the road surface, not only is the shock from the bottom dampened, but that from the front is dampened so that the shock absorbing effect can be developed satisfactorily.

As shown in both the left and right positions of FIG. 1, the support shaft 12 is held by the fork 13 through elastic force at a perpendicularly upper part of the eccentric shaft 11. Namely, under ordinary conditions, the eccentric retainer 10 stands upright in a vertical direction. For this reason, the body 1 hardly moves in the vertical direction even when a rider pedals the bicycle with his full strength on a flat road surface.

When going over a bump 4, the wheel 2 moves in a longitudinal direction. Therefore, energy caused by a rocking motion of the wheel 2 which is accumulated in the elastic body is returned again to a rotational motion of the wheel 2. Consequently, loss of running energy is reduced by a large margin.

When braking is effected by sandwiching braking surfaces with pressure by means of the braking members, the wheel 2 rocks in the same manner as described above. For this reason, the braking surface is applied with pressure by the braking member while moving in a radial direction relative to the braking member, so that locking of the wheel 2 is prevented.

The suspension system has an eccentric retainer and the brake system has a braking surface which is only widened in the radial direction, so that the bicycle front wheel control mechanism of this invention is simple in its structure and easy in maintenance and inspection.

Figure 2:
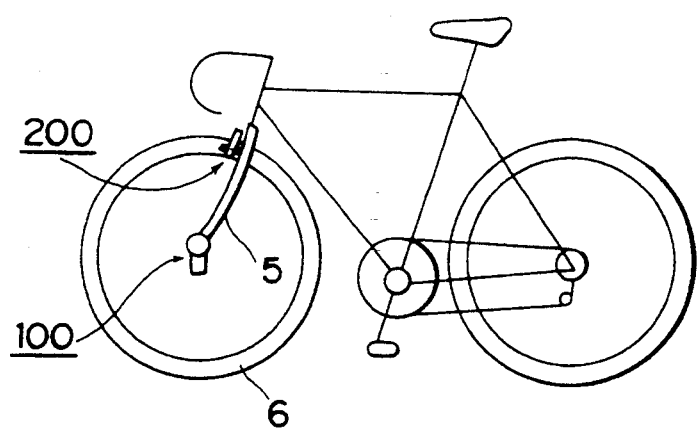
FIG. 2 is a general schematic side view showing a bicycle equipped with a bicycle front wheel control mechanism according to a first embodiment of this invention.
Figure 3:
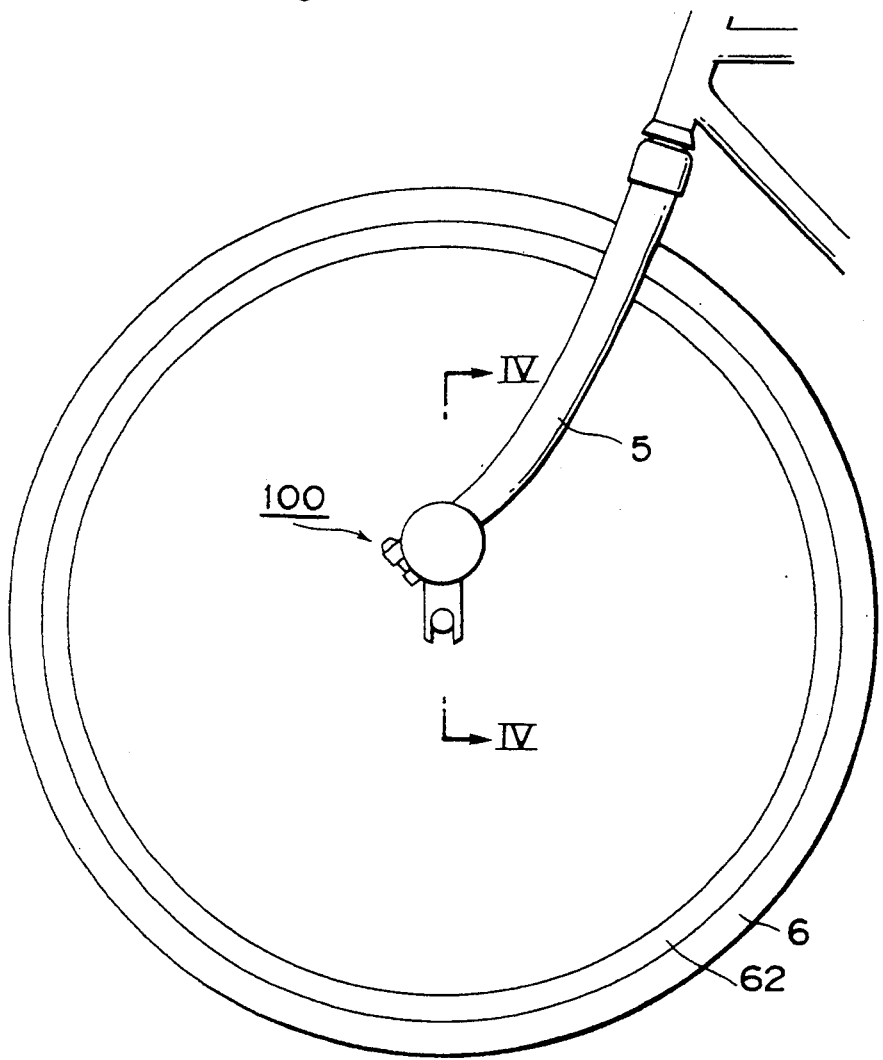
FIG. 3 is an enlarged view of the suspension system of FIG. 2.

In FIG. 2 which is a general schematic side view showing a bicycle equipped with a front wheel control mechanism according to a first embodiment of this invention, 100 denotes a suspension system for suspending front wheel 6 attached to a front fork 5, and 200 denotes a brake system for braking the front wheel 6.

Figure 4:
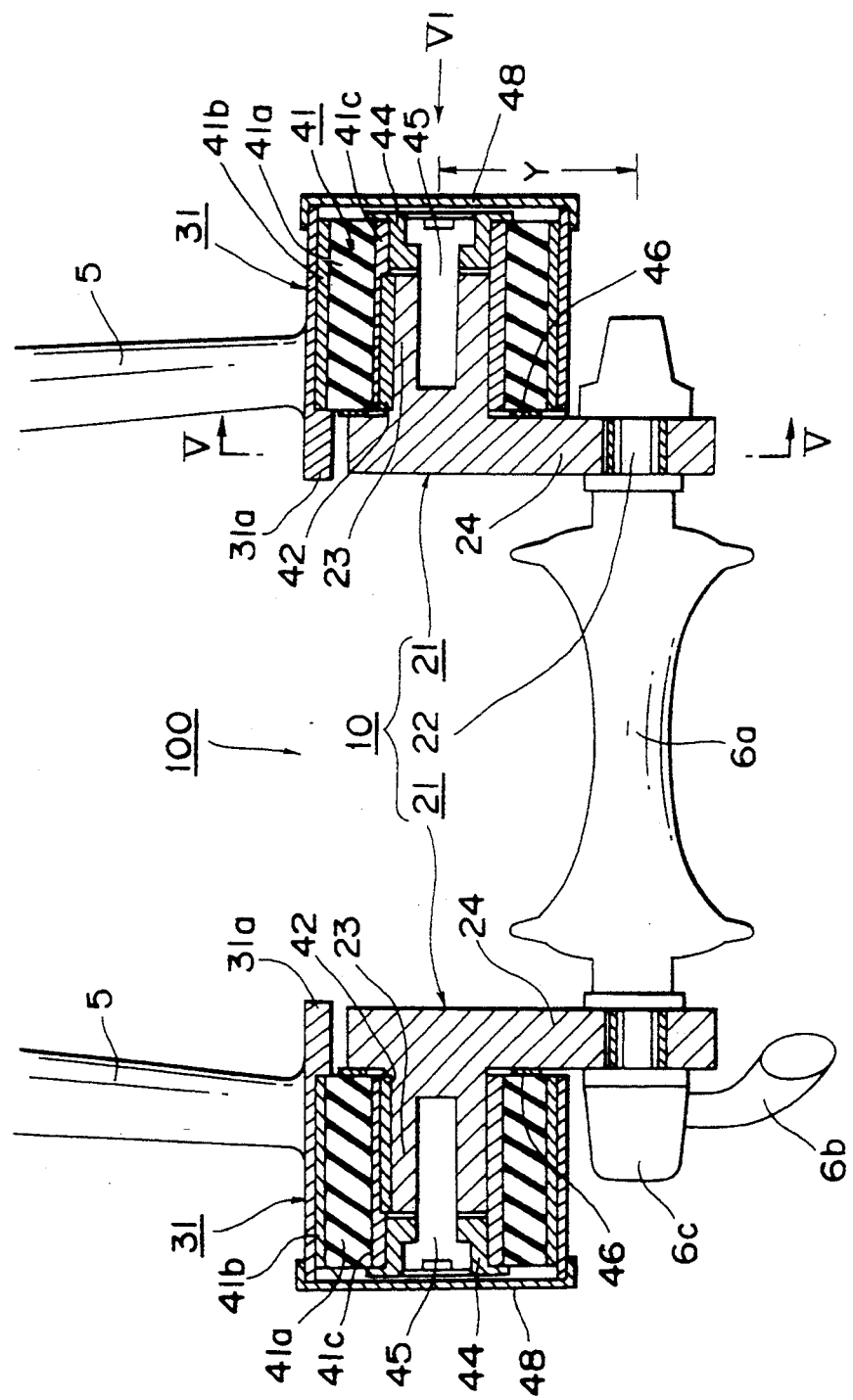
FIG. 4 is a sectional view taken on the line IV—IV of FIG. 3.
Figure 5:
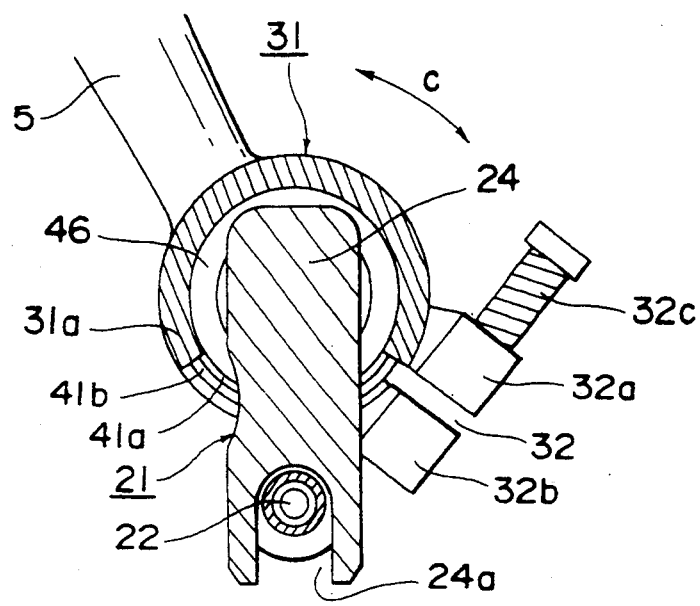
FIG. 5 is a sectional view taken on the line V—V of FIG. 4.
Figure 6:
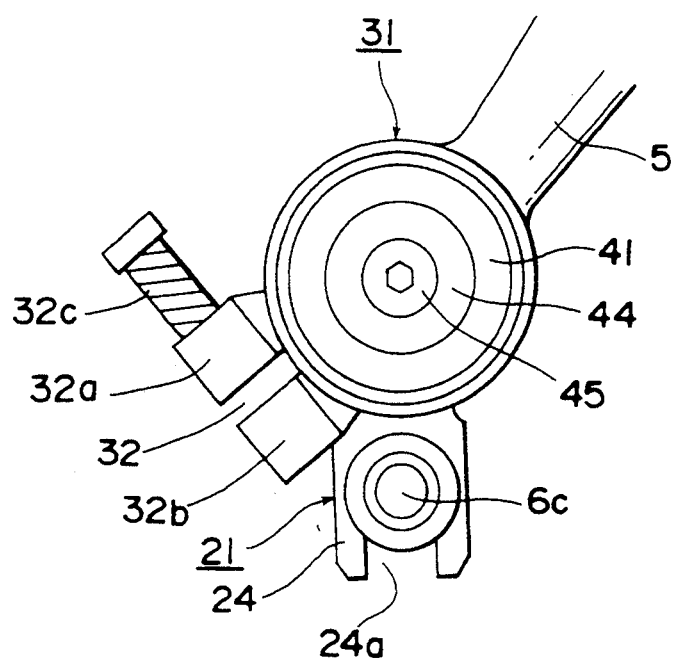
FIG. 6 is a side view as seen in the direction of arrow VI of FIG. 4.

This suspension system 100 is composed of an eccentric retainer 10, and the eccentric retainer 10 is composed of two L-shaped members 21 and hollow axle (eccentric shafts) 22 (FIG. 4). A hub 6a of the front wheel 6 is carried by the axle 22 through a ball bearing (not shown), and the front wheel 6 is adapted to rotate freely around the axle 22 (in the direction of arrow C of FIG. 5). The L-shaped member 21 is composed of a shaft portion (support shaft) 23 and a flat plate-like arm 24. A groove 24a is formed at the bottom end of the arm 24, and the axle 22 is fit in and secured by the groove 24a at both its ends. The axle 22 is parallel to the shaft portion 23, and the arm 24 is perpendicular to the shaft portion 23. The hub 6a is secured firmly to the arm 24 by a cam shaft 6b and an adjusting nut 6c.

Figure 7:
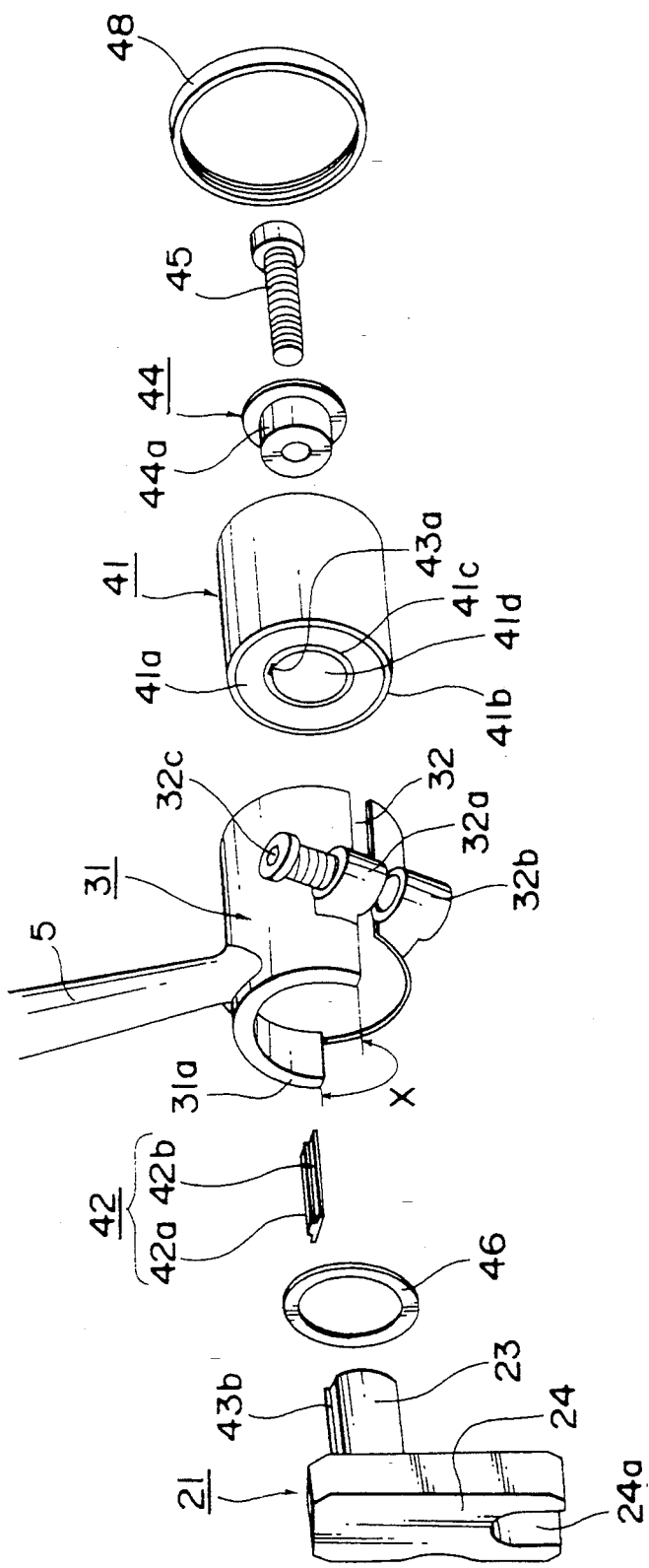
FIG. 7 is an exploded perspective view showing a structure for carrying an elastic body and L-shaped member by a housing of the first embodiment.

On the other hand, a housing 31 is formed at the tip end of the front fork 5, and an elastic body 41 and the shaft portion 23 of the L-shaped member 21 are carried in the housing 31. As can be seen in FIG. 7, the housing 31 is formed into a cylindrical shape opening in an axial direction (a lateral direction as seen in FIG. 4), and provided with a slit 32 so that it can be fastened. This fastening is done by tightening bosses 32a and 32b, which are formed on an external surface of the housing 31 with the slit 32 between them, using a hexagon socket head screw 32c.

The elastic body 41 is cylindrical, and composed of a thick body 41a comprising a rubber and a thin external member 41b and internal member 41c both made of metal secured to both surfaces of the body 41a. The body 41a is a member which permits a twisting within a specified angular range. The shaft portion 23 is fit in a hole 41d of the elastic body 41, and is prevented from rotating by a key 42 relative to and around the elastic body 41. The elastic body 41 is prevented from rotating around the housing 31 i.e. around its axis by fastening the housing 31 by tightening the slit 32. The key 42 has a convex section. A groove 43a in which a convex portion 42a of the key 42 fits is formed on an internal surface of the internal member 41c, and a groove 43b in which a base portion 42b of the key 42 fits is formed on an external surface of the shaft portion 23.

A cover having a cylindrical portion 44a fits in a hole 41d. The cover 44 is so constructed that the cylindrical portion 44a is fit in the hole 41d from the side opposite the L-shaped member 21, and secured to the shaft portion 23 by a screw 45. Namely, the L-shaped member 21 is secured to the elastic body 41 immovably in an axial direction by the cover 44 and the hexagon socket head screw 45. 46 denotes an annular receiving plate made of resin and installed between the arm 24 and the elastic body 41. The L-shaped member 21 is carried by the housing 31 in a position where the arm 24 stands upright by adjusting around its axis the securing state of the elastic body 41 to the housing 31. Namely, the shaft portion 23 is located perpendicularly above the axle 22. A cover seals the housing 31 at the side opposite to the axle 22. Threads screwing onto an external surface of the housing 31 are cut on an internal peripheral surface of the cover 48.

Further, a stopper 31a is integrally formed at the L-shaped member 21 side of the housing 31. The stopper 31a is formed by enlarging the axial width of the housing 31 and notching its lower circular arc portion by a specified range X (FIG. 7).

In the suspension system 100 thus constructed, an assembly to have the housing 31 carry the L-shaped member 21 is executed in the following manner. In the first place, the elastic body 41 is housed in the housing 31 with the slit 32 loosened, and then the slit 32 is fastened to secure it. The receiving plate 46 is passed on the shaft portion 23, the key 42 is fit in the groove 43b of the shaft portion 23, and the shaft portion 23 is fit in the hole 41d while fitting the key 42 to the groove 43a. Then, the cover 44 is secured to the shaft portion 23 by the screw 45.

In the suspension system 100 thus constructed, the L-shaped member 21 maintains the position where the arm 24 is kept upright because no shock is given to the front wheel 6 from both the bottom and the front when the bicycle is running on a flat road surface. In other words, the suspension system 100 does not effect a shock absorbing function when the bicycle is running on a flat road surface. Accordingly, the bicycle body hardly moves in the vertical direction even when the rider pedals the bicycle with his full strength, so that he can exert his full force.

Figure 8:
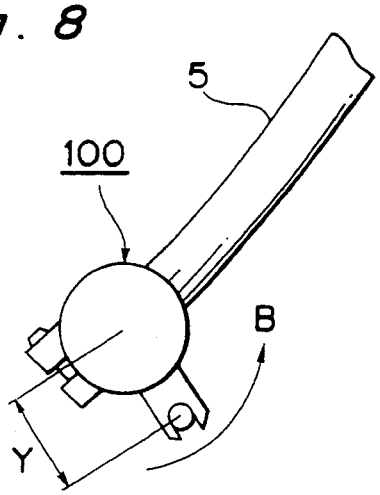
FIG. 8 is an enlarged side view showing the working state of a suspension system according to the first embodiment.

On the other hand, when the bicycle goes over a bump 4 (FIG. 1) of the road surface, shock is experienced by the front wheel 6 from both the bottom and the front. When the shock is directed to the front wheel 6 from the front, the front wheel 6 rocks to the rear (in the direction of arrow B) as shown in FIG. 8 by a specified angle around the shaft portion 23 with an axis distance Y (FIG. 4 & FIG. 8) between the shaft portion 23 and the axle 24 as its radius, while twisting the body 41a of the elastic body 41. The shock from the front is relieved to the rear by this rocking motion. In addition, since the front wheel 6 rocks in this way so as to move up too, the shock from the bottom is relieved upwardly. As described above, the suspension system 100 satisfactorily dampens both the shocks given to the front wheel 6 from the bottom and the front when the front wheel 6 goes over a bump 4 on road surface.

Figure 9:
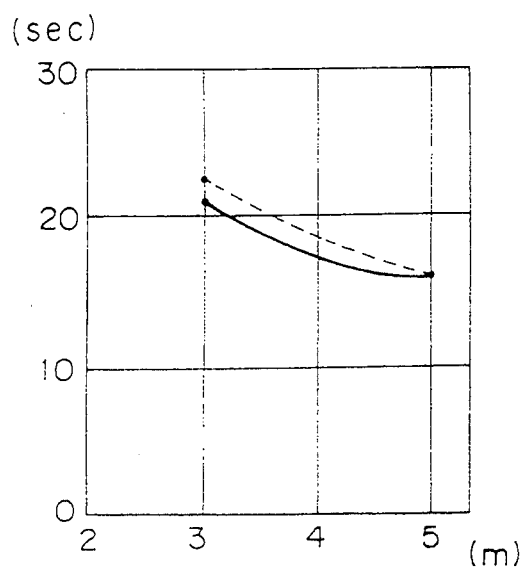
FIG. 9 is a curve showing the running time of a bicycle according to the first embodiment when running on a flat road surface in a snaking manner to avoid obstacles placed apart at a fixed distance.
Figure 10:
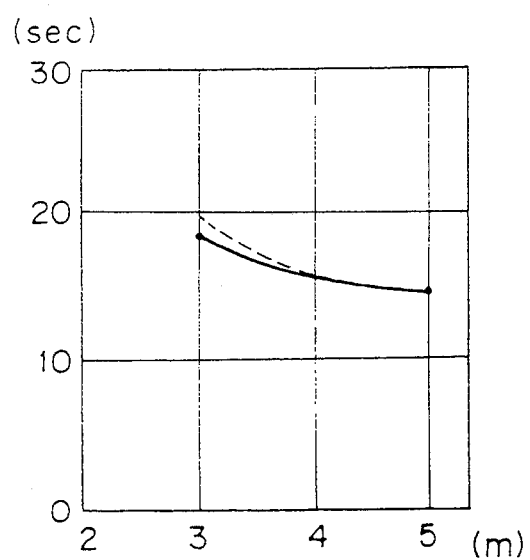
FIG. 10 is a curve showing the running time of a bicycle according to the first embodiment when running on an ascending slope in a snaking manner to avoid obstacles placed apart at a fixed distance.

Further, a small shock may be given to the front wheel 6 from the front when an abrupt turn is made in order to avoid some danger when running on a road surface. Even in this instance, the front wheel 6 rocks as described above so that the shock given from the front is relieved rearwardly. Consequently, the shock from the front at time of turning the handlebars is also dampened to provide a nimble steering operation so as to improve the running property. Reference is now made to FIG. 9 and FIG. 10. In order to investigate the running property, obstacles were placed at specified intervals within a distance of 100 meters on a flat road surface. A bicycle was run at a constant speed in a snaking manner while steering clear of the obstacles. The obstacles were placed in the same way within a distance of 80 meters on an ascending slope so that the bicycle was run similarly in a snaking manner. In this instance, the angle of the ascending slope was 10 degrees. FIG. 9 shows the times required for running on the flat road surface using a bicycle of this invention and a conventional bicycle, when changing the intervals between the obstacles, setting them at 3 meters, 4 meters and 5 meters. FIG. 10 shows corresponding times required for running on the ascending slope surface. The solid line represents a bicycle according to this embodiment and the broken line represents a conventional bicycle, the abscissa indicates the interval and the ordinate indicates the time. It can be understood from both figures that the time required for running is shorter using the present invention than the conventional bicycle. This shows an improvement in the running property in the control mechanism of this invention as compared to the prior art construction. Particularly, it should be specially mentioned that the running property is excellent when ascending a slope.

Moreover, when the front wheel 6 goes over a bump 4, the front wheel 6 rocks as described above to move to the rear and then rocks in the opposite direction by a twisting reaction to return to the front. For this reason, the energy accumulated in the elastic body 41 by the rocking motion of the front wheel 6 is returned to the rotating motion of the front wheel 6 again. Consequently, any loss of running energy is reduced by a large margin.

On the other hand, since the upward movement of the front wheel 6 increases when the front wheel 6 rocks excessively, there is a possibility that the front wheel 6 may thrust up a crown (not shown) of the front fork 5. In the suspension system 100, however, the stopper 31a is formed on the housing 31 so that the arm 24 of the L-shaped member 21 strikes against an end portion of the stopper 31a to control the pivoting to within the range of X (FIG. 7) even when the front wheel 6 moves excessively in case of rocking to the front and the rear as described above. The range X is prescribed to such an extent that the front wheel 6 does not strike against the crown even when the arm 24 rocks to a position where it strikes against the stopper 31a. Therefore, when the front wheel 6 goes over a projection 4, there is no chance for the front wheel 6 to thrust up the crown in the suspension system 100.

Figure 11:
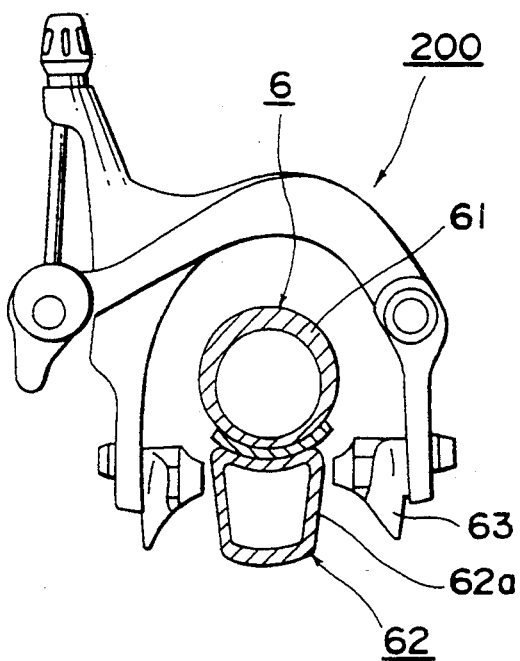
FIG. 11 is a partially sectional front view showing a brake system according to the first embodiment.
Figure 12:
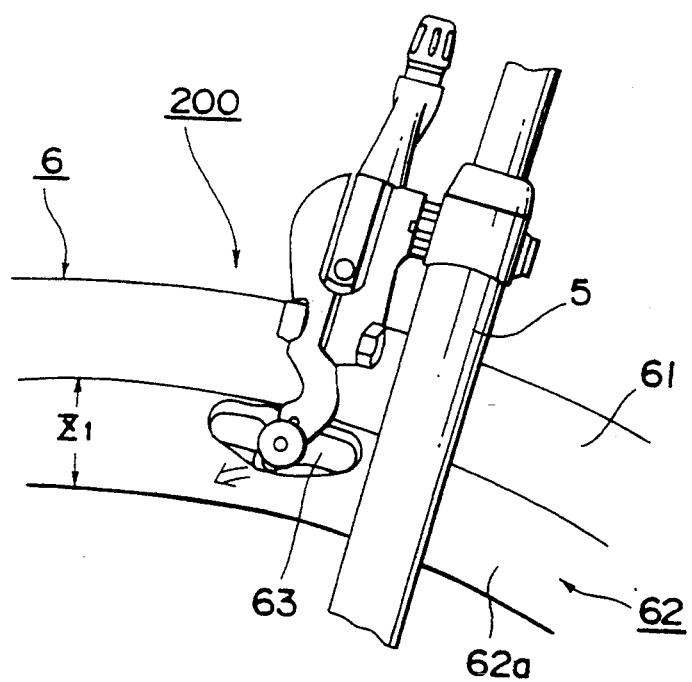
FIG. 12 is a side view showing a brake system according to the first embodiment.

Turning to FIG. 11 and FIG. 12, there is seen a brake system 200. The brake system 200 is so constructed that side surfaces (braking surfaces) 62a of a rim 62 installed at an inner periphery of a tire 61 are held between and applied with pressure by brake shoes (braking members) 63 in order to brake. When the front wheel 6 is braked, a shock from the front is applied to the front wheel 6 in the same way as when the front wheel 6 goes over a bump 4. However, this shock is relieved to the rear by the rocking motion of the front wheel 6 in the same way as when the front wheel 6 goes over a bump 4. In the brake system 200, the side surface 62a of the rim 62 is designed in such a way as to have a radial width Z1 (FIG. 12) which includes a portion always facing the brake shoe 63 in an axial direction, even when the front wheel 6 rocks as described above to move in a radial direction relative to the brake shoe 63.

According to the brake system 200 thus constructed, since the front wheel 6 rocks as described above when a braking is effected, pressure is applied to the side surfaces 62a of the rim 62 by the brake shoes 63 while moving in the radial direction relative to the brake shoes 63. For this reason, the front wheel 6 is prevented from locking. In this instance, the side surface 62a of the rim 62 is formed wide in the radial direction as described above, so that the side surfaces 62a of the rim 62 are sandwiched between and securely applied with pressure by the brake shoes 63.

The suspension system 100 thus constructed comprises the eccentric retainer 10, and the brake system 200 has the structure in which the side surface 62a of the rim 62 is only widened in the radial direction. Therefore, the bicycle front wheel control mechanism of this embodiment is simple in its structure and easy in maintenance and inspection.

Figure 13:
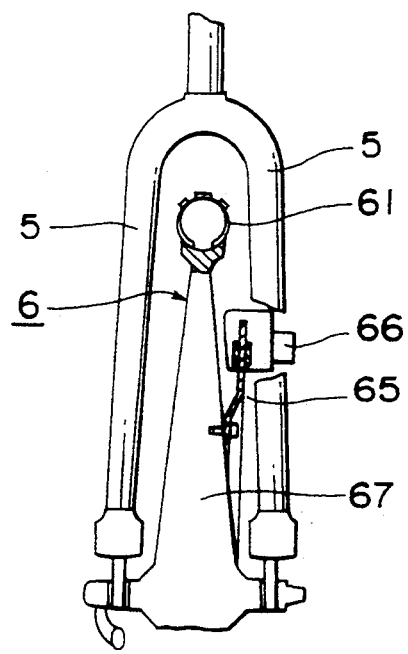
FIG. 13 is a partially sectional front view showing a brake system according to a second embodiment.
Figure 14:
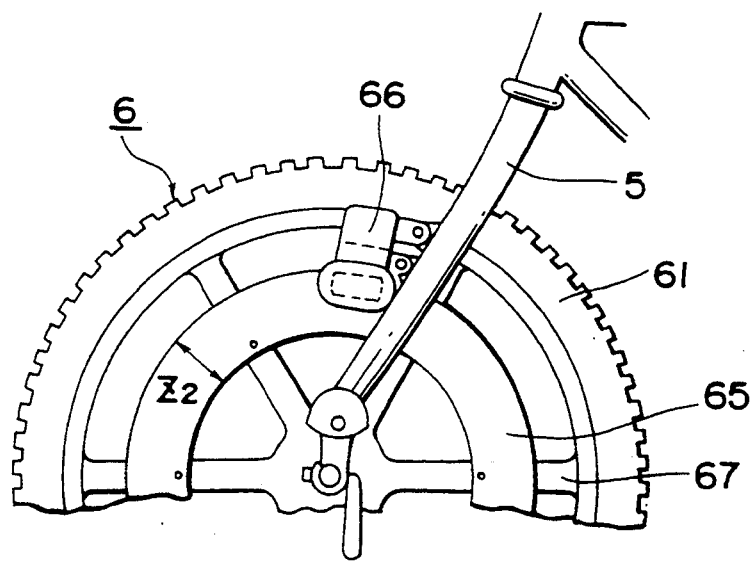
FIG. 14 is a side view showing a brake system according to the second embodiment

The brake system of the second embodiment as shown in FIGS. 13 and 14 is so constructed that a circular plate (disc) 65 installed at a side of the front wheel 6 is sandwiched between pads (not shown) of a caliper 66 so as to be braked. 67 denotes a spoke of the front wheel 6. The circular plate 65 is designed in such a way as to have a radial width Z2 (FIG. 14) which includes a portion always facing the pad 63 in the axial direction, even when the front wheel 6 pivots in the same way as in the first embodiment to move in the radial direction relative to the pads.

Even by the brake system thus constructed, since the front wheel 6 rocks in the same way as described with reference to the first embodiment when the braking is effected, the circular plate 65 is sandwiched between the pads while moving in the radial direction relative to the pads. For this reason, the front wheel 6 is prevented from locking. In this instance, the circular plate 65 is formed wide in the radial direction as described above, so that the circular plate 65 is sandwiched by the pads securely.

Figure 15:
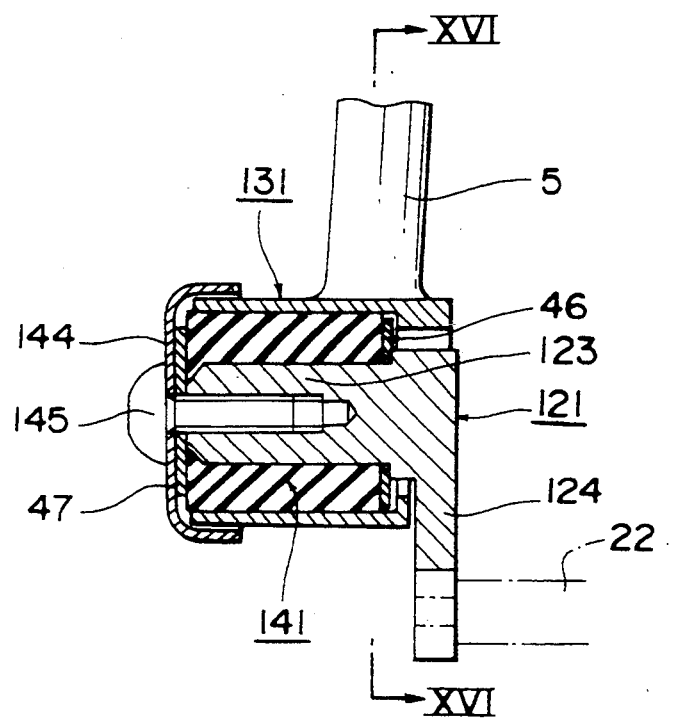
FIG. 15 is a front elevational view showing a suspension system according to a third embodiment and is a partial sectional view corresponding to FIG. 4.
Figure 16:
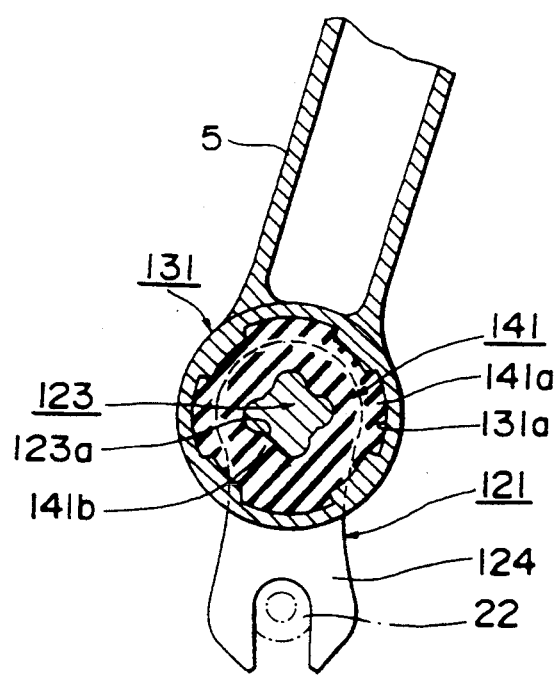
FIG. 16 is a sectional view taken on the line XVI—XVI of FIG. 15.

As shown in FIG. 15 and FIG. 16, a cover 144 is formed into a plate-like shape, and secured to a shaft portion 123 of an L-shaped member 121 through a spacer 47. An elastic body 141 is a thick cylindrical body consisting only of a rubber. Four convex portions 141a, which extend in an axial direction and spaced equally in a circumferential direction, are formed on an external surface of the elastic body 141 and four convex portions 141b, which extend in an axial direction and spaced equally in a circumferential direction, are also formed on an internal surface thereof. Namely, both the external and internal surfaces of the elastic body 141 are so formed as to be corrugated into spline-like shapes. On the other hand, the housing 131 is a cylindrical body, which does not include a slit 32 such as provided in the first embodiment, but has a stopper (not shown) similar to that of the first embodiment. Concave portions 131a in which the convex portions 141a of the elastic body 141 fit are formed on an internal surface of the housing 131, and concave portions 123a in which the convex portions 141b of the elastic body 141 fit are formed on an external surface of the shaft portion 123. Namely, the internal surface of the housing 131 and the external surface of the shaft portion 123 are so formed as to be corrugated into spline-like shapes. The elastic body 141 is so secured to the housing 131 as not to rotate around its axis by fitting the convex portions 141a in the concave portions 131a, and is so secured to the shaft portion 123 as not to rotate around its axis by fitting the convex portions 141b in the concave portions 123a. 124 denotes an arm of the L-shaped member 121, and 145 denotes a screw for fastening the cover 144 to the shaft portion 123. Other components are the same as those of the suspension system 100 of the first embodiment.

In the suspension system thus constructed, the housing 131 having a simple cylindrical shape is used in order to hold the elastic body 141 and the L-shaped member 121 to the housing 131, the elastic body 141 consisting only of rubber is used, and in addition the key 42 of the first embodiment is not required. Therefore, the suspension system of this embodiment includes the advantage of very simple structure as compared with that of the suspension system 100 of the first embodiment. The fundamental function and effect of the suspension system are the same as those of the suspension system 100.

Figure 17:
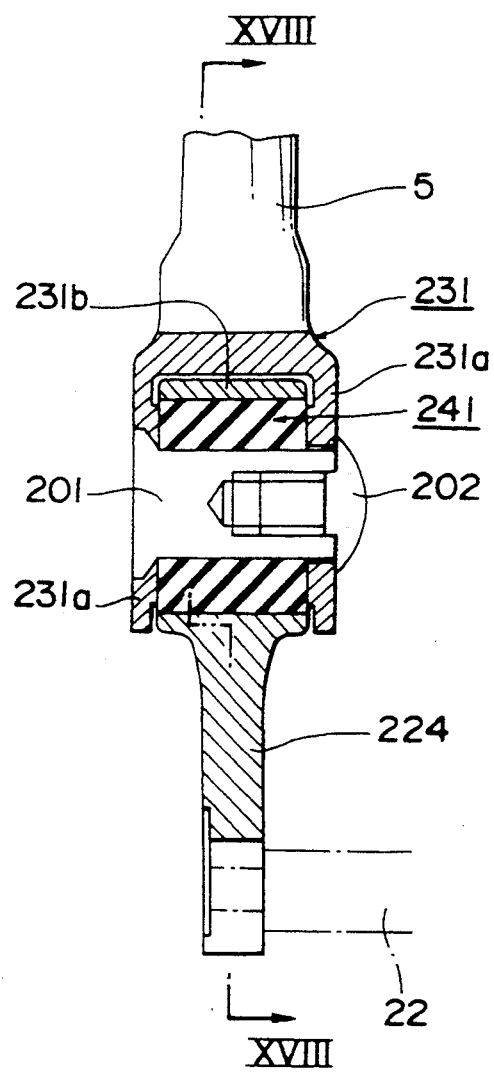
FIG. 17 is a front elevational view showing a suspension system according to a fourth embodiment and is a partial sectional view corresponding to FIG. 4.
Figure 18:
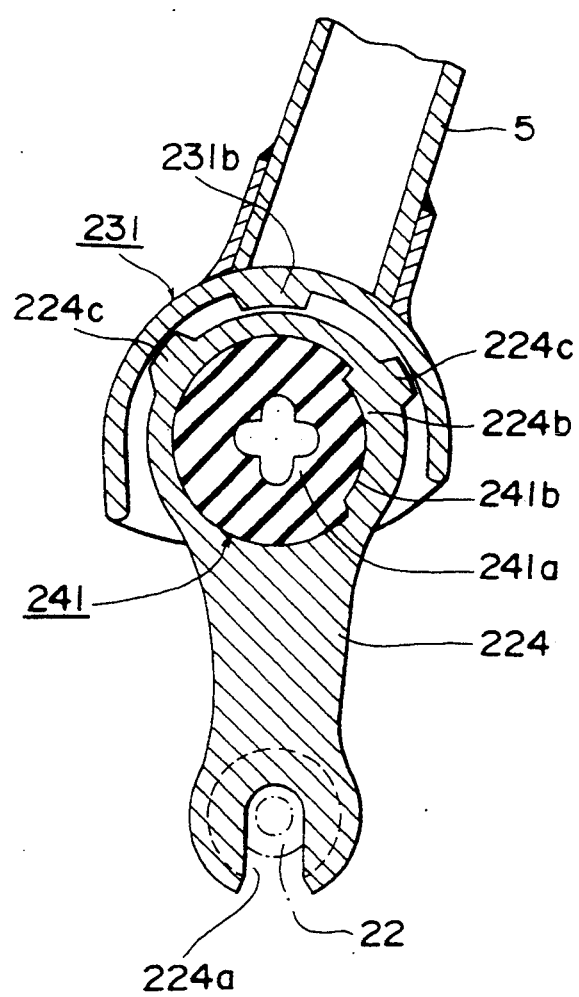
FIG. 18 is a sectional view taken on the line XVIII—XVIII of FIG. 17.

The suspension system of the fourth embodiment as shown in FIGS. 17 and 18 is composed of an eccentric retainer comprising an axle 22, two plate-like arms 224, and insertion nut 201 and bolt 202 (shaft body) for securing arms 224 to housings 231 respectively. The axle 224 is inserted in and secured to a groove 224a at a lower end portion of the arm 224. The arm 224 incorporates an elastic body 241 at its upper end part. The elastic body 241 has a cylindrical structure piercing through the arm 224 in its axial direction, and its outer peripheral surface is stuck to the arm 224 so that it can not rotate relative to and around the arm 224. Convex portions 241a are formed on an inner peripheral surface of the elastic body 241 and a concave portion 241b is formed on its outer peripheral surface. The concave portion 241b is fit to a convex portion 224b of the arm 224 while concave portions (not shown) to which the convex portions 241a of the elastic body 241 fit are formed on an outer peripheral surface of the insertion nut 201, and the insertion nut 201 inserted in the elastic body 241 does not rotate relative to and around the elastic body 241.

The housing 231 opens downward for incorporating an upper end part of the arm 224 and including both axially spaced side walls 231a. The bolt 202 piercing one side wall 231a is screwed in the insertion nut 201 inserted by piercing the other side wall 231a, so that the arm 224 is secured to and supported by the housing 231 to form an inboard structure. Two convex portions 224c extending in axial directions are formed on an outer peripheral surface at the upper end part of the arm 224 with specified spaces left between them around its axis. A convex portion 231b is formed on an inside surface of an upper wall of the housing 231 so as to be located between the convex portions 224c, and the rocking angle of the arm 224 around its axis is limited by the convex portions 224c against the convex portion 231b. The distance between the two convex portions 224c is so set that the front wheel 6 does not thrust up the crown even when the arm 224 rocks to a position where the convex portions 224c strike against the convex portion 231b.

In the suspension system thus constructed, the insertion nut 201 and the bolt 202 are adapted only to pierce through the elastic body 241 in order to secure the arm 224 to the housing 231, the elastic body 241 consisting only of the rubber is used, and further the key 42 of the first embodiment is not required. Therefore, the suspension system has the advantage of a very simple structure as compared with that of the suspension system 100 of the first embodiment. The fundamental function and effect of the suspension system are the same as those of the suspension system 100.

Figure 19:
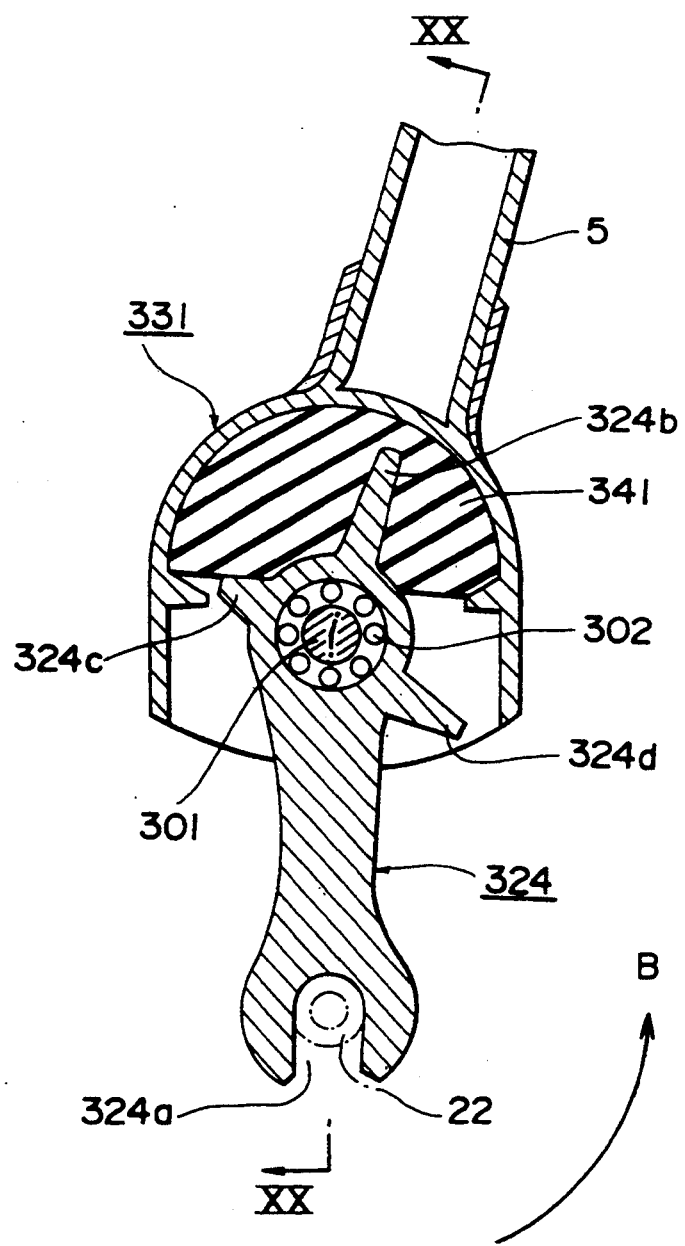
FIG. 19 is a side elevational view showing a suspension system according to a fifth embodiment and is a partial sectional view corresponding to FIG. 18.
Figure 20:
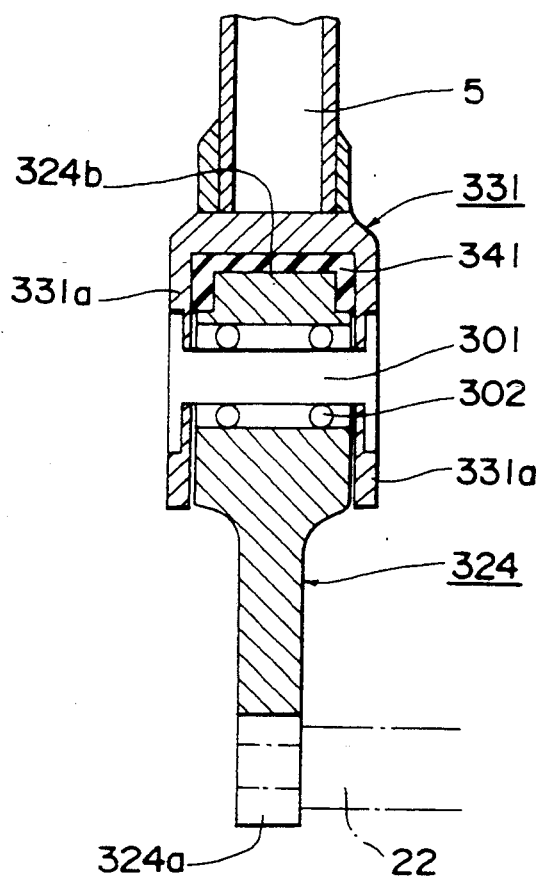
FIG. 20 is a sectional view taken on the line XX—XX of FIG. 19.

The suspension system of the fifth embodiment shown in FIGS. 19 and 20 is composed of an eccentric retainer comprising an axle 22, two plate-like arms 324, and supporting shaft (shaft body) 301 for securing arms 324 to housings 331 respectively. The axle 22 is inserted in and secured to a groove 324a at a lower end portion of the arm 324. The support shaft 301 pierces an upper part of the arm 324 in the axial direction, and can freely rotate relative to and around the arm 324 through a bearing 302. A convex portion 324b extending upward past the support shaft 301 is formed at an upper end portion of the arm 324.

The housing 331 opens downward for incorporating the upper end part of the arm 324 and including both axially spaced side walls 331a. An elastic body 341 is buried in an inside upper part of the housing 331 and stuck to its internal surface. The arm 324 is secured to and supported by the housing 331 to form an inboard structure by means of the support shaft 301 piercing through both side walls 331a such that the convex portion 324b is inserted in the elastic body 341. 324c and 324d denote convex portions formed on an upper external surface of the arm 324, and the convex portion 324c is in contact with a lower surface of the elastic body 341.

In the suspension system thus constructed, when the arm 324 rocks as indicated by the arrow B, the convex portion 324b rocks against an elastic force of the elastic body 341. Namely, in regard to rocking of the arm 324, the elastic body 341 functions in the same way as those of the elastic bodies described in the foregoing embodiments, and the fundamental function and effect of the suspension system thus constructed are the same as those of the suspension system 100.

The elastic body 341 may be stuck to the internal surface of the housing 331 in the suspension system thus constructed, so that this system has the advantage of a very simple structure as compared with the suspension system 100 of the first embodiment.

The following technical factors may be added to the foregoing embodiments:

(1) An elastic body having a proper spring characteristic is to be used. Since a spring characteristic of the elastic body has an influence on riding comfort, it is desirable to provide the elastic body with a proper spring characteristic according to the running conditions of the bicycle. For instance, a spring characteristic may be used which has a small hardness at first but then increases gradually and quickly.

(2) As for the rim shape of the braking system, a radial tapered angle has a large influence on the braking characteristic and braking feeling. When the tapered angle is large, a movement of the brake lever becomes large so as to decrease a rise-up of braking force at time of commencing braking operation, but no locking of wheel occurs. A braking feeling will become nearer to a present feeling with a decrease in the tapered angle.

(3) When the stationary state position of the eccentric retainer is located a little to the rear of a perpendicular position, the suspension system acts as if the elastic body is softened. However, vertical movement of the bicycle body is apt to occur when it is pedaled with full strength. The inclining angle of the eccentric retainer at its stationary state may be adjusted in such a way that splines are cut on an external surface of an external member 41b of the elastic body 41 and an internal surface of an internal member 41c thereof, and further on an internal surface of the housing 31 and an external surface of the shaft portion 23 both of which fit in and onto the above members.

Figure 21:
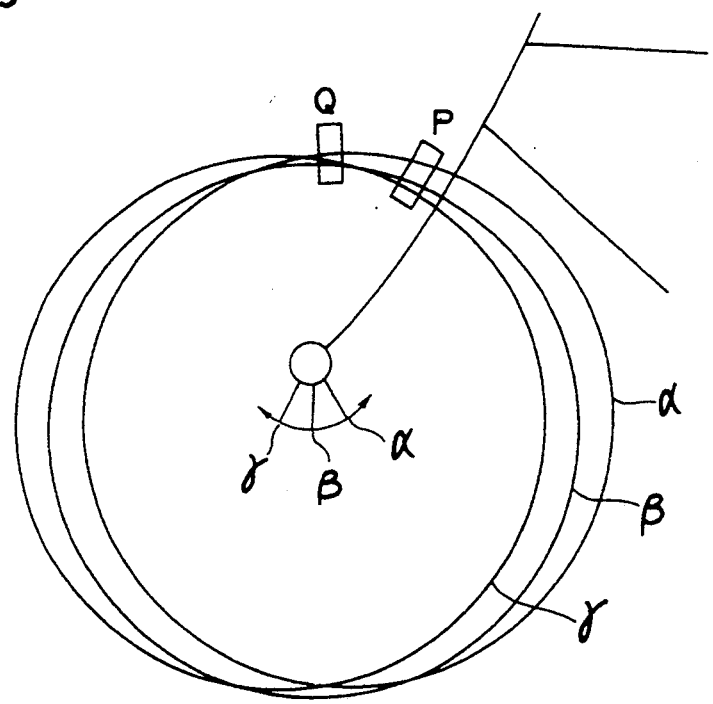
FIG. 21 is a schematic side view showing the relation between braking position and rim width.
Figure 22:
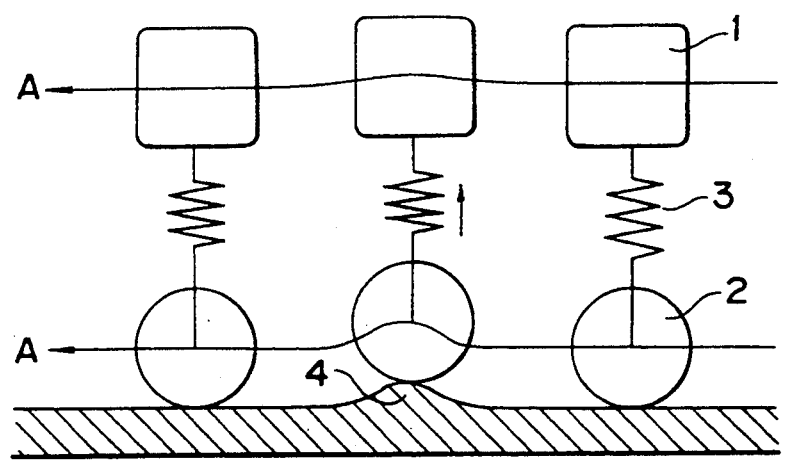
FIG. 22 is a schematic side view showing the working principle of a general conventional suspension system.

(4) As seen from FIG. 21, when a braking position is located at a position Q on a perpendicularly upper part of the axle rather than at a position P, the rim width required for braking can be minimized. FIG. 21 shows cases where the front fork is in a stationary position and the front wheel is rocked to positions $\alpha$, $\beta$ and $\gamma$ respectively.

(5) As is generally known, the performance of the suspension system can be improved by providing a damping force by an oil damper or friction force.

(6) A recession may be made on the rim to make it easier to supply air to the tire. In a tubular rim of 700 C-size for example, when the rim height is large, the thrusting size of the valve from the rim becomes small so that it becomes hard to supply air. However, this problem can be solved by forming the rim into such a structure.

(7) A large nose dive of the front fork can occur when there is abrupt braking; the load applied to the rear wheel is reduced so that locking is apt to occur. In order to prevent this trouble, well-known countermeasures of adjusting braking force may be taken such as restricting the load transfer to the front wheel or reducing the friction coefficient of the brake shoe at the rear wheel side.

As described above, the following effects can be obtained by the bicycle front wheel control mechanism of this invention:

(1) When the front wheel 6 goes over a bump 4 on a road surface, the front wheel 6 can be pivoted to the rear and further moved also upwardly by the function of the eccentric retainer 10. Accordingly, not only is the shock given to the front wheel 6 from the bottom dampened but the shock from the front is dampened, so that the shock absorbing effect can be produced to a maximum extent.

Further, the shock given to the front wheel 6 from the front when an abrupt turn is made can also be dampened so that the steering ability can be improved too.

(2) In ordinary conditions, the eccentric retainer 10 can be kept upright in the vertical direction. Consequently, even when the rider pedals the bicycle with his full strength on a flat road surface, vertical movement is hardly created in the bicycle body so that the rider can pedal it with his full strength.

(3) The front wheel 6 is adapted to move in a longitudinal direction when going over a bump 4. Therefore, the energy accumulated in the elastic body 41 by the rocking motion of the front wheel 6 is returned again to the rotation motion of the front wheel 6 so as to minimize the loss of running energy by a large margin.

(4) The braking surface is adapted to be pressed by the braking member while moving in the radial direction relative to the braking member. Therefore, experiments proved that no locking occurred in the front wheel 6.

(5) The suspension system composed of the eccentric retainer and the braking system is so constructed as to only widen the braking surface in the radial direction, so that the bicycle front wheel control mechanism of this invention is simple in its structure and easy in maintenance and inspection.

What is claimed is:

1. A bicycle front wheel control mechanism comprising a suspension system attached to a front fork of the bicycle to support a front wheel and a brake system for braking the front wheel, wherein the suspension system comprises an eccentric retainer formed into a crank-like structure and composed of an axially central eccentric shaft and support shafts located at both ends of and in parallel with the eccentric shaft, the eccentric retainer is in alignment with an axle of the front wheel at the eccentric shaft and supported at the support shafts by front forks through an elastic body at perpendicularly upper parts of the eccentric shaft, the eccentric retainer is applied with an elastic force for supporting the support shafts in a perpendicularly upward direction and giving a restoring force to a rocking motion around the support shafts, and the suspension system is able to rock around the front wheel with a distance between the support shafts and the eccentric shaft as its radius, the brake system presses a braking surface provided on the front wheel by means of a braking member secured to the front fork in an axial direction so as to exert a braking force, and the braking surface has such a radial width as always leaving a portion which faces on the braking member in the axial direction even when the front wheel carries out the above rocking motion, and the eccentric retainer comprises a rod body composing the eccentric shaft and two L-shaped members composing the support shafts, the L-shaped members comprise a shaft portion parallel with the rod body and an arm rectangular to the rod body, the rod body is fit in and secured to a groove at a lower end of the arm at both ends, and the eccentric retainer is supported by the front fork at the shaft portion of the L-shaped members.

2. A bicycle front-wheel control mechanism as set forth in claim 1, wherein a cylindrical housing opening in an axial direction is formed at a tip end of the front fork, the shaft portion of the L-shaped members is carried in the housing through a cylindrical elastic body, the housing is provided with a slit so as to fastened, and the elastic body is locked unrotatably to the housing by fastening the housing and further locked unrotatably to the shaft portion by inserting key between it and the shaft portion.

3. A bicycle front wheel control mechanism comprising:
(A) a suspension system attached to a front fork of the bicycle to support a front wheel, wherein said suspension system comprises an eccentric retainer formed into a crank-like structure comprising:
(1) an axially central eccentric shaft, and
(2) a support shaft located at each end of and in parallel with the eccentric shaft and at perpendicularly upper parts of the eccentric shaft, the eccentric retainer being in alignment with an axle of the front wheel at the eccentric shaft, and being supported at the support shafts by front forks through an elastic body at a perpendicularly upper part of each end of the eccentric shaft; whereby the eccentric retainer prevents a part of the energy expended by a rider from being lost by vertical movement of the front fork when pedalled on a flat surface, whereby the eccentric retainer is adapted to be applied with an elastic force for supporting the support shafts in a perpendicularly upward direction and giving a restoring force to a rocking motion around the support shafts, and the suspension system is adapted to be able to rock around the front wheel with the distance between the support shafts and the eccentric shaft as its radius; and (B) a brake system for braking the front wheel comprising:
(1) a braking member secured to the front fork in the axial direction, said braking member having a pressing surface with a radial width, and
(2) a braking surface on the front wheel and having a radial width larger than the radial width of the pressing surface of the braking member, said braking member adapted to press on said braking surface so as to exert a braking force, and the radial width of the braking surface is so set that the braking surface always has a part facing in the axial direction on the pressing surface of the braking member even when the front wheel rocks backward around the support shaft to its maximum extent.

4. A bicycle front wheel control mechanism as set forth in claim 3, wherein the eccentric retainer comprises a rod body comprising the eccentric shaft and two L-shaped members comprising the support shafts, the L-shaped members each comprising a shaft portion parallel to the rod body and an arm perpendicular to the rod body, the rod body being fit in and secured to a lower end of the arm at both ends, and the eccentric retainer is supported by the front fork at the shaft portion of the L-shaped member.

5. A bicycle front wheel control mechanism as set forth in claim 4, wherein a cylindrical housing opening in an axial direction is formed at a tip end of the front fork, the shaft portion of the L-shaped member is carried through an elastic body secured to an internal cylinder and an external cylinder located in the housing, the external cylinder of the elastic body is locked to the housing, and the internal cylinder of the elastic body is locked to the shaft portion.

6. A bicycle front wheel control mechanism as set forth in claim 4, wherein a cylindrical housing opening in an axial direction is formed at a tip end of the front fork, the shaft portion of each of the L-shaped members is carried in the housing through a cylindrical elastic body, the elastic body is locked to the housing by fitting a corrugated portion formed on its outer peripheral surface in a corrugated portion formed on an inner peripheral surface of the housing and further locked to the shaft portion by fitting a corrugated portion formed on its inner peripheral surface in a corrugated portion formed on an outer peripheral surface of the shaft portion.

7. A bicycle front wheel control mechanism as set forth in claim 3, wherein the eccentric retainer comprises a rod body comprising the eccentric shaft, an arm rectangular to the rod body at both ends of the rod body, and a shaft body located at an upper end portion of the arm and comprising the support shaft, the rod body is fit in and secured to a lower end of the arm at both ends, the elastic body is incorporated in the upper end portion of the arm so that it cannot rotate around an axis of the arm, a housing opening downward for incorporating the upper end portion of the arm is formed at a tip end of the front fork, the arm is secured to and supported by axially spaced side surfaces of the housing to form an inboard structure through means of the shaft body piercing through the elastic body in an axial direction, and the elastic body is fixed against rotation around an axis of the shaft body.

8. A bicycle front wheel control mechanism as set forth in claim 13, wherein the eccentric retainer comprises a rod body comprising the eccentric shaft, an arm perpendicular to the rod body at both ends of the rod body, and a shaft body located at an upper part of the arm and composing the support shaft, the rod body is fit in and secured to a lower end of the arm at both its ends, the shaft body is adapted to be freely rotatable around the arm, a convex portion extending upward rather than the support shaft is formed at an upper end portion of the arm, a housing opening downward for incorporating the upper part of the arm is formed at a tip end of the front fork, the elastic body is stuck to an internal surface of the housing, and the arm is secured to and supported by axially spaced side surfaces of the housing to form an inboard structure through means of the shaft body piercing in an axial direction under a state where the convex portion at the upper end portion is inserted in the elastic body.

9. A bicycle front wheel control mechanism as set forth in claim 3, wherein the brake system comprises a side surface of a rim for the braking surface and a brake shoe for the braking member.

10. A bicycle front wheel control mechanism as set forth in claim 3, wherein the brake system comprises a side surface of a circular plate concentric with the front wheel for the braking surface and pads sandwiching the circular plate for the braking member.

11. A bicycle front wheel control mechanism as set forth in claim 3, wherein stoppers for limiting a movable range of the eccentric retainer are provided at the tip end of the front fork, in order to restrict a rocking motion of the front wheel within such a range that the front wheel does not thrust up a crown of the front fork.

* * * * *